United States Patent
Stolte

[15] 3,657,780
[45] Apr. 25, 1972

[54] METHOD FOR MAKING A BEARING
[72] Inventor: Werner Stolte, Hamburg, Germany
[73] Assignee: Licentia Patent Verwaltungs GmbH, Frankfurt, Germany
[22] Filed: Mar. 10, 1970
[21] Appl. No.: 18,069

[52] U.S. Cl.................29/148.4 R, 29/148.4 A, 29/148.4 B, 308/193
[51] Int. Cl....................B21h 1/12, B21h 1/14, B23p 11/00
[58] Field of Search..............29/148.4 R, 149.5 R, 149.5 DP, 29/148.4 A, 148.4 B; 308/193

[56] References Cited

UNITED STATES PATENTS

| | | |
|---|---|---|
| 2,652,620 | 9/1953 | Sutowski...........................29/148.4 X |
| 3,423,813 | 1/1969 | Bloomquist..........................29/148.4 |
| 3,482,296 | 12/1969 | Sampatacos..........................29/148.4 |

Primary Examiner—Thomas H. Eager
Attorney—Spencer & Kaye

[57] ABSTRACT

A method for making a lightweight, precision, angular-contact bearing, the ball-contacting rings of which are forged from a forging alloy principally of aluminum, with small amounts of copper, magnesium, nickel, iron, silicon, manganese, zinc and titanium. After forging and precipitation-hardening, the rings are pre-stretched from about 2 percent to 3 percent, then rough-worked to within approximately one millimeter of final dimension, and then shock-normalized by exposing them alternately to high and low, mutually approaching temperatures. In this way it is possible to obtain rings suitable for a precision, lightweight bearing whose coefficient of thermal expansion can be matched to that of a piece of machinery also constructed of lightweight materials.

7 Claims, 2 Drawing Figures

PATENTED APR 25 1972 3,657,780

Inventor:
Werner Stolte

BY Spencer & Kaye
ATTORNEYS.

3,657,780

METHOD FOR MAKING A BEARING

BACKGROUND OF THE INVENTION

The present invention relates to a method for making a precision angular-contact bearing constructed of lightweight materials. The bearing includes an outer ring, an inner ring, balls and a ball cage.

The term "angular-contact bearing" is in accordance with the usage in the description of FIG. 8 of pages 8-184 of the "Standard Handbook for Mechanical Engineers," 7th Edition, by Baumeister and Marks, McGraw-Hill Book Co..

It is commonly known that high-tolerance, precision bearings must not experience any dimensional changes that can affect the smooth running of the machinery mounted thereon. And this condition must be insisted upon in spite of temperature changes, pressure variations, and impulse loading.

The manufacture of a high-tolerance machine which must be mounted on precision rotational bearings is faced with special difficulties when it is desired to use light materials to form the machine's structural components, because the material of the precision bearings must withstand the static and dynamic design loads while at the same time matching the thermal expansion coefficient of the structural material of the machine itself.

Until this time only highly alloyed steels have been used for making precision bearings. And, even if saving of weight was desired, it was not possible to build precision machinery out of light metals or light metal alloys because it was not possible to achieve a matching of coefficients of thermal expansion. Thus, whenever a machine requiring precision bearings was to be built, it was necessary to make the machine itself also out of steel, in order that there be a matching of the coefficients of thermal expansion. Weight saving by use of light metals was not, therefore, possible.

SUMMARY OF THE INVENTION

An object of the present invention, therefore, is to provide a method for manufacturing a precision bearing of lightweight materials. At very exact tolerances and smooth operation, the bearing of the present invention must be able to withstand shaking and shock loading without suffering damage to the contact surfaces of the ball and rings.

These, as well as other objects which will become apparent in the discussion that follows, are achieved, according to the present invention, by making the outer ring and the inner ring of the angular contact-bearing of the present invention from an aluminum-copper-magnesium-nickel forging alloy by forging and, after forging, precipitation hardening and pre-stretching by from 2 to 3 percent. After rough-working of the rings, precipitation hardened and they are subjected to a shock-normalizing process. As used herein, the term "rough-working" means turning a ring on a lathe to within approximately 1 millimeter of final dimension. Important is that any dimensional changes occurring during the shock-normalizing treatment must not render impossible the attainment of any particular dimension in the finished ring.

According to a further development of the present invention, the ring material is subjected to a vacuum clamping process in order to achieve thin-walled bearings of extremely high tolerances.

It is preferred that the balls of the bearings of the present invention be made from alloyed steel conventionally used for the balls of ball bearings or from a glass-ceramic material.

In order to cut down on the inertia of the bearing of the present invention, one embodiment thereof includes a ball cage made from hard paper, instead of the usual bronze.

The essential advantage of the present invention is that it now becomes possible to build precision machinery from lightweight materials without having to suffer from an accompanying lowering in the quality of the bearing operation. Lower weight means lower bearing torques as well as a quieter operation of the rotating machinery.

DESCRIPTION OF THE PREFERRED EMBODIMENTS

Figure 1:
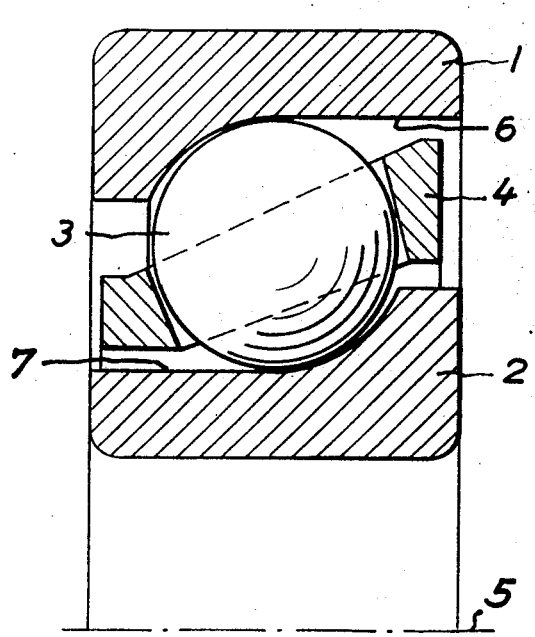
FIG. 1 is the upper half of the section of a bearing made according to the present invention. The plane of the figure contains the axis 5 of the bearing.

Referring to FIG. 1, the bearing of the present invention comprises an outer ring 1, an inner ring 2, balls 3 and ball cage 4. Ball races 6 and 7 are provided in the rings 1 and 2, respectively, and the balls 3 bear against these races.

The outer ring 1 and the inner ring 2 are made, according to the invention, from a forging alloy of aluminum, copper, magnesium and nickel. The forging alloy has a composition of 1.9 − 2.7 percent copper, 1.3 − 1.8 percent magnesium, 0.9 − 1.2 percent nickel, 0.9 − percent iron, 0.25 percent max. silicon, 0.2 percent max. manganese, 0.2 percent max. zinc, 0.04 − 0.2 percent titanium, others total 0.05 percent, and remainder aluminum. Alloys outside of said limits do not show the dimensional and shape stability that is necessary for precision rotational bearings.

The alloy is first forged into the shape rings of greater dimensions than required for the finished product. These forged rings are then precipitation hardened and pre-stretched by forcing them onto a cone. It is preferred to pre-stretch in the amount of 2 to 3 percent. Thus the final inner diameter of the forged rings is 102 percent to 103 percent of the initial inner diameter. The purpose of this pre-stretching operation is to erase residual stresses left in the rings after forging. This pre-stretching is followed by a rough-working of the rings.

Figure 2:
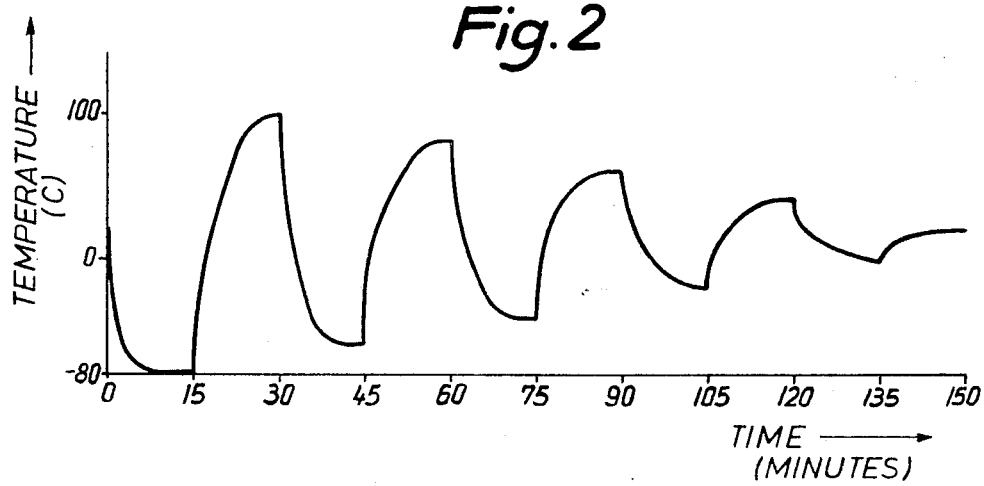
FIG. 2 is a graphical illustration of a shock-normalizing process of the present invention.

According to the invention, in order to completely remove residual stresses, the rings 1 and 2 are subjected after rough-working to a shock-normalizing process. This shock-normalizing process comprises bringing the rings from room temperature to a temperature of −80° C., holding the ring for about 15 minutes at this temperature, then bringing the rings to a temperature of +100° C. and holding the rings there for 15 minutes. The rings are next brought to −60° C., held for 15 minutes, then to +80° C., etc., until room temperature is again reached. This process is illustrated in FIG. 2. The temperature shown in this Figure is of a point within a ring most remote from the surface with respect to heat transfer, so that such point always responds most slowly to temperature changes at the surface.

The particular shock-normalizing treatment disclosed in the previous paragraph has proven to give exceptional results in achieving the goals of the present invention with the alloy and dimensions of the ring of Example I below. Naturally, those skilled in the art will realize that the best parameters of quenching fluid, temperatures, time at temperatures, etc., for a given alloy and ring dimension will vary, but it is believed that the present disclosure provides a basis upon which those skilled in the art may adjust the actual values of the process parameters for any particular situation.

Experiments have shown that material treated as above described shows especially high dimensional and shape accuracy over a long period of time. For example, the surface of such treated material is exposed to repeated rolling of 70,000 times under a load of 64 kiloponds (the unit of force in the c.g.s. system of units equals 1 pond) and suffer a failure rate of only 0.1 percent. Also indicating the exceptional advantage of rings made according to the above process, the contact surfaces of such bearings can be loaded in a shaking device up to 5.5 g, wherein "g" refers to the acceleration of gravity, without being damaged. Shock loading of 20 g also does not affect the performance of the bearing.

The above described tests were performed on a ring material prepared as in Example I. The test dealing with repeated rolling is carried out on a three-shaft-testing-device which is provided with a testing ring with an outer diameter of 58.5 mm and two rings of steel of the same size. These rings are arranged round a roller of steel with an outer diameter of 14 mm. The roller stands in contact with the three rings along axial contact lines, so that the testing device can be turned by means of a d-c motor which is arranged on one of the steel rings. Thus the test ring is rolled over with three different loads — 19, 41 and 64 kp — till fatigue of material is taking place.

The failure rate is a statistical value stating the portion of the destructed bearings in relation to a great quantity of test bearings at fixed loads and after a fixed number of load cycles. Thus follows that only 0.1 percent of the bearings according to the invention are on an average damaged after 70,000 load cycles with a load of 64 kp.

The above mentioned shaking test is performed on an angular-contact bearing provided with rings prepared as in Example I. The bearing is mounted in a shaking device which is provided with drive means loading the bearing with forced shake motions having amplitudes of 0.15 mm up to 2 mm and frequencies of 10 Hz up to 80 Hz (1 Hz = 1 sec$^{-1}$) at acceleration values of about 5 g.

To carry out the shock test a bearing according to the invention is mounted in a device provided with some accelerometers. Then the device is let fall from a fixed height of 7 mm against a rigid plate. At the bounce there are measured high accelerations of about 20 g. After that test the effect of the acceleration loads on the dimensional and shape accuracy of the bearing are examined by mesuring the precision of the running of the bearing.

Thin-wall bearings of large diameter can be made using material prepared as above described. It is advantageous when manufacturing the rings of such bearings to use a vacuum clamping process in order to achieve very exact shapes.

In said clamping process the rings are fastened on a working plate by using vacuum. The working plate has bores in those regions adjacent the frontal surfaces of the rings. These bores are connected a to chamber, which is held evacuated by means of a vacuum pump. Thus the rings can be finish ground without affecting the desired tolerances and without using clamping jaws.

Besides steel, the balls of the present invention can also be made from a glass-ceramic material. If the bearing does not have to be especially precise and if the ball-loads are small, an acetal copolymer can be used as the material for the balls.

Glass ceramic balls having a specific gravity of 2 show a Vickers hardness of 900 kiloponds per square millimeter and a contraction of 0 percent (i.e., there is no decrease in the volume of the balls over time). They can be spherically ground with high accuracy quite as easily as steel balls.

The glass-ceramic material consists of h-quartz-mixed-crystals. Crystallites of this material have a size of about 400 A. The material has a modulus of elasticity of 9,400 kp/mm$^2$, a thermal conductivity of 1.46 kcal/m.h. °C., and a specific heat of 0.197 cal/g.° C. A particular glass-ceramic material is manufactured by Schott & Gen., Mainz, Germany under the designation "Schottglaskeramik 8562."

The plastic balls have a Vickers hardness of, at a maximum, 20 kiloponds per square millimeter and show a contraction of at most 1.7 percent. A qualified shape accuracy as well as a reduction in contraction can be achieved with these plastic balls by an oil tempering process at about 100° C.

The acetal copolymer is a thermoplastic material which is built up by linear nonbranched polymeric chain molecules and which has a partly crystalline structure. The balls are produced by a splash costing process and are most usable for bearings with low loads. A particular acetal copolymer is known under the trademark "Hostadur Op 24" of Farbwerke Hoechst AG.

In order to achieve a reduction in the contraction of the acetal copolymer, the plastic balls are tempered in an oil bath at 100° C for about 15 minutes.

The ball cage 4 is made of hard paper rather than the usual steel or bronze. Therefore, not only the total weight of the bearing of the present invention remains low; in addition there is a substantial lessening of inertial effects due to the cage itself.

The hard paper consists of Novotex hard tissue with cotton texture and is impregnated with phenolic resin.

However, as already mentioned above, the essential advantage of the lightweight precision bearing of the present invention lies in that it is now possible to build an entire piece of precision machinery from a light metal such as aluminum or magnesium.

EXAMPLE I

Using a blank of aluminum alloy having a composition of 2.4 percent copper, 1.25 percent magnesium, 1.1 percent nickel, 1.01 percent iron, 0.25 percent silicon, 0.1 percent manganese, 0.1 percent zinc, 0.06 percent titanium, and remainder aluminum, which alloy is manufactured by the firm Fuchs, Meinerzhagen, Germany, under the trade designation AN 44.79, a forging press is used to forge the blank to a ring having a rectangular cross section with an inner diameter of 290 mm, an outer diameter of 350 mm and an axial thickness of 30 mm. The forging results in a directional grain flow within the metal. The thus prepared ring is now mounted in a lathe and turned to the shape of the outer ring 1 in FIG. 1, except that the ball race 6 is not yet present; the cross section of the ring is thus still substantially rectangular. The thickness of the ring in the axial direction is 5 mm greater than that finally desired, and the other surfaces of the outer ring 1 are also 5 mm oversize. Thus the outer diameter of the ring is 10 mm oversize.

This ring is heat treated by first running a solution heat treatment at 500° C for 5 hours, followed by a quench in water at 20° C. This solution heat treatment is followed by artificial aging by holding the ring at 170° C for 10 hours. The outer ring 1 is then forced onto a conical tapered mandrel and pushed in the direction of increasing mandrel diameter until the inner diameter of the ring 1 becomes permanently set at 103 percent greater than its initial size. The mandrel diameter increases 0.5 cm in an axial distance of 10 cm.

The prestretched ring is now mounted in a lathe and turned to within 1 mm of final dimension. This rough-worked ring is then shock-normalized in the manner illustrated in FIG. 2. The shock-normalizing process is carried out in a container much like a forced-air furnace used for heat treatment of aluminum alloys, except that means are provided to bring the forced air to − 80° C. After the ring has been held for 15 minutes in −80° C. forced air, it is then removed and immediately placed into a forced air furnace whose temperature is controlled at + 100° C. Again the ring is left for 15 minutes after which it is transferred to a forced-air container held at − 60° C. and held there for 15 minutes. The sequence of steps is repeated as shown in FIG. 2 until 20° C. room temperature is again attained. Thereupon the ring is mounted in a lathe once more and turned to within 0.3 mm of final dimension. This fine-worked ring can be finally normalized by holding the ring at 180° C. for 2 hours. The next step in the process is to bring the ring 1 to final dimensions and this is done by clamping the ring on the vacuum clamping plate and by finish grinding to a tolerance on the outer diameter of ± 0.005 mm and wall thickness of ± 0.003 mm.

The thus prepared ring has a coefficient of thermal expansion of $23 \times 10^{-6}$ mm/mm ° C., a modulus of elasticity of 7,200 kp/mm$^2$, a tensile strength of 40 kp/mm$^2$, a yield strength of 32 kp/mm$^2$, an elongation (round specimen, specimen length five times the specimen diameter) of 7 percent and a Brinell hardness (500 kp load, 10 mm ball) of 115 kp/mm$^2$.

Except for the dimensions, the inner ring 2 of the bearing is to be prepared in the same manner.

It will be understood that the above description of the present invention is susceptible to various modifications, changes and adaptations, and the same are intended to be comprehended within the meaning and range of equivalents of the appended claims.

I claim:

1. A method for making a lightweight precision bearing, comprising the steps of forging an alloy consisting principally of aluminum, and containing small amounts of copper, magnesium, nickel, iron and titanium, into a ring, precipitation hardening said ring, prestretching said ring from 2 to 3 percent, rough-working said ring, and then shock-normalizing it.

2. A method as claimed in claim 1, further comprising the step of vacuum clamping said ring for its finish working.

3. A method as claimed in claim 1, further comprising the steps of forming a ball from an acetal copolymer oil-tempered at 100° C. for about 15 minutes, forming a race in said ring, and arranging said ball in bearing relationship against said race.

4. A method for making a bearing ring suitable for use in precision bearings, comprising the steps of forging a light-metal forging alloy into the shape of a ring, precipitation-hardening said ring, pre-stretching said ring, and shock-normalizing said ring.

5. A method as claimed in claim 4, said alloy being essentially of aluminum, copper, magnesium, and nickel.

6. A method as claimed in claim 4, said pre-stretching being to 2 to 3 percent permanent set.

7. A method as claimed in claim 1, wherein said alloy has substantially the following composition: 2.4 percent copper, 1.25 percent magnesium, 1.1 percent nickel, 1.01 percent iron, 0.25 percent silicon, 0.1 percent manganese, 0.1 percent zinc, 0.06 percent titanium, remainder aluminum.

* * * * *